United States Patent [19]

Smith

[11] Patent Number: 5,139,710
[45] Date of Patent: Aug. 18, 1992

[54] SHADOW BOUNDARY PROCESS FOR THE CONTINUOUS RADIANT CURE OF COMPOSITES

[75] Inventor: Charles R. Smith, LaMesa, Calif.

[73] Assignee: Global Thermal Conditioning, Inc., Scottsdale, Ariz.

[21] Appl. No.: 705,366

[22] Filed: May 24, 1991

[51] Int. Cl.$^5$ ............................................. B29C 35/10
[52] U.S. Cl. .................................... 264/22; 264/103;
  264/167; 264/136; 264/174; 264/178 R;
  264/209.2; 264/209.6; 264/236; 264/285;
  264/310; 425/174.4
[58] Field of Search ............... 264/22, 257, 136, 258,
  264/103, 167, 174, 285, 178 R, 310, 209.2, 236,
  209.6; 425/174.4; 427/54.1; 156/289

[56] References Cited

U.S. PATENT DOCUMENTS

| | | | |
|---|---|---|---|
| Re. 27,973 | 4/1974 | Pinnington et al. | 156/175 |
| 2,779,388 | 1/1957 | Quoss | 264/137 |
| 2,887,721 | 5/1959 | Blanchi et al. | 264/22 |
| 3,629,028 | 12/1971 | McLarty et al. | 156/175 |
| 3,676,249 | 7/1972 | Limelton | 156/244 |
| 3,733,228 | 5/1973 | Wisch | 156/172 |
| 3,810,816 | 5/1974 | Zachariades | 161/214 |
| 3,874,329 | 4/1975 | McLarty | 118/125 |
| 3,922,426 | 11/1975 | Jaltzin | 428/295 |
| 4,012,267 | 3/1977 | Klein | 156/178 |
| 4,012,553 | 3/1977 | Clemens | 428/285 |
| 4,019,062 | 4/1977 | Rongren | 250/492 |
| 4,055,769 | 10/1977 | Sandler | 250/492 R |
| 4,092,443 | 5/1978 | Green | 427/53 |
| 4,130,451 | 12/1978 | Hamilton et al. | 156/86 |
| 4,182,665 | 1/1980 | Mibu et al. | 204/159.15 |
| 4,186,044 | 1/1980 | Bradley et al. | 156/273 |
| 4,222,835 | 9/1980 | Dixon | 204/159.16 |
| 4,230,766 | 10/1980 | Gaussino et al. | 428/288 |
| 4,252,592 | 2/1981 | Green | 156/272 |
| 4,252,593 | 2/1981 | Green | 156/231 |
| 4,276,352 | 6/1981 | Green | 428/473.5 |
| 4,276,479 | 6/1981 | Mibu et al. | 250/492 R |
| 4,477,707 | 10/1984 | Kim | 219/10.55 A |
| 4,479,984 | 10/1984 | Levy et al. | 427/54.1 |
| 4,515,737 | 5/1985 | Karino et al. | 264/22 |
| 4,699,802 | 10/1987 | Lakos et al. | 427/54.1 |
| 4,753,704 | 6/1988 | Stewart | 156/275.5 |
| 4,758,397 | 7/1988 | Schreiner et al. | 264/166 |
| 4,770,834 | 9/1988 | Nakasone et al. | 264/127 |
| 4,814,119 | 3/1989 | Scholz | 425/174.4 |
| 4,861,621 | 8/1989 | Kanzaki | 264/22 |
| 4,867,824 | 9/1989 | Gill et al. | 156/175 |
| 4,876,153 | 10/1989 | Thorfinnson | 156/289 |
| 4,892,764 | 1/1990 | Drain et al. | 428/34.5 |
| 4,904,536 | 2/1990 | Livesay | 427/54.1 |
| 4,956,221 | 9/1990 | Gutek | 428/142 |
| 5,043,128 | 8/1991 | Umeda | 264/258 |
| 5,055,242 | 10/1991 | Vane | 264/22 |

FOREIGN PATENT DOCUMENTS 3431867 9/1986 Fed. Rep. of Germany ........ 264/22

OTHER PUBLICATIONS

"Radiation Curing of Polymeric Materials", C. E. Hoyle 1990 American Chemical Society, pp. 1–16.
"Fiber-Reinforced Composites", P. K. Malbrick, Marcue Dikken, Inc, pp. 61–68, 345–375.

Primary Examiner—Jeffery Thurlow
Attorney, Agent, or Firm—Charles E. Cates; Frank T. Barber

[57] ABSTRACT

A method for the production of fiber reinforced palstic composites, in which a continuously moving array of fibers is impregnated with resin and fast cured as it passes through a shadow boundary created by a source of radiant energy such as ultraviolet light. The method is useful for the production of axial composites such as tubes, pipes, conduits, ducts and the like, which may be created without mandrels by passing the array of fibers through closed dies. The method is also useful with open or rolling dies to create nonaxial composites such as wall panels, guard rails, vehicle body parts, and the like.

34 Claims, 3 Drawing Sheets

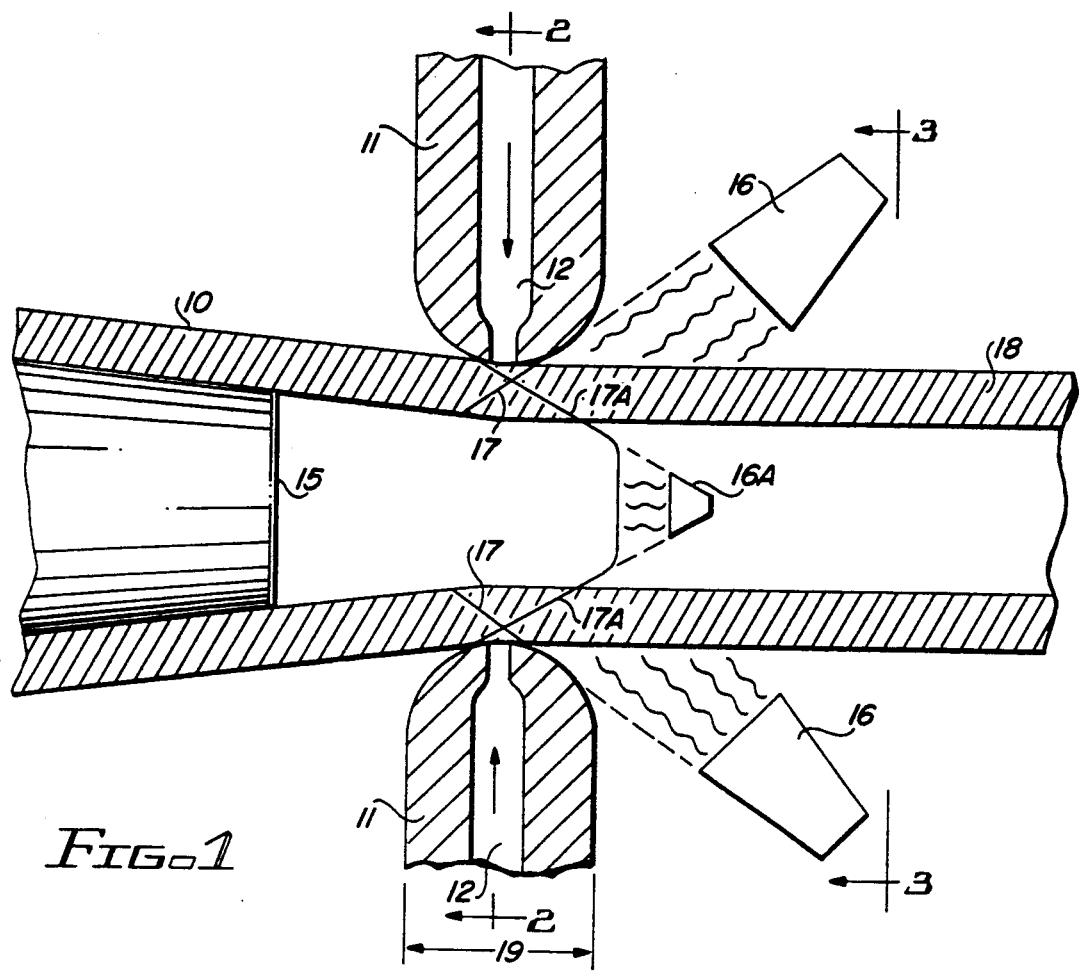
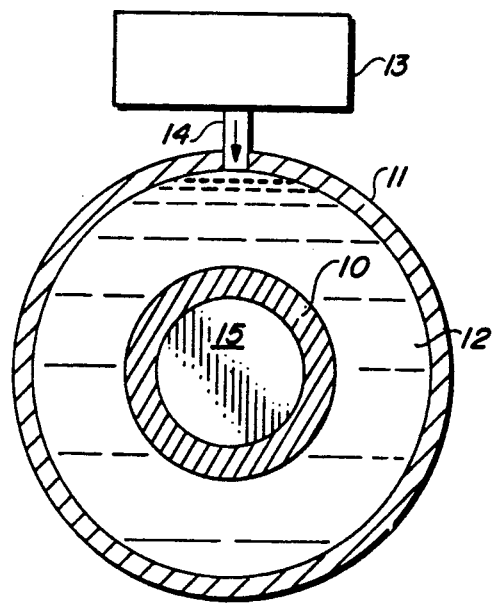
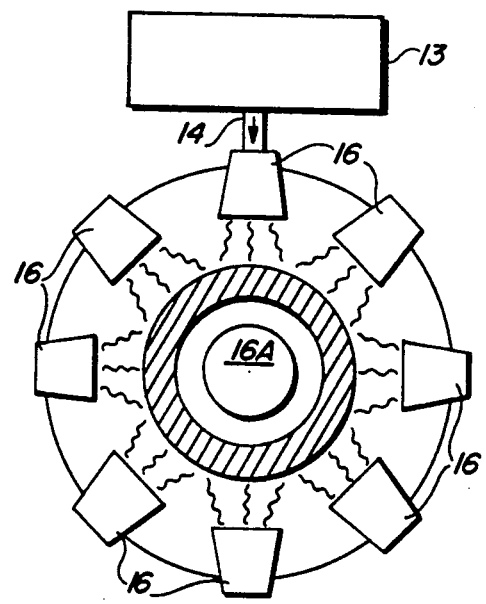
FIG. 1
FIG. 2
FIG. 3

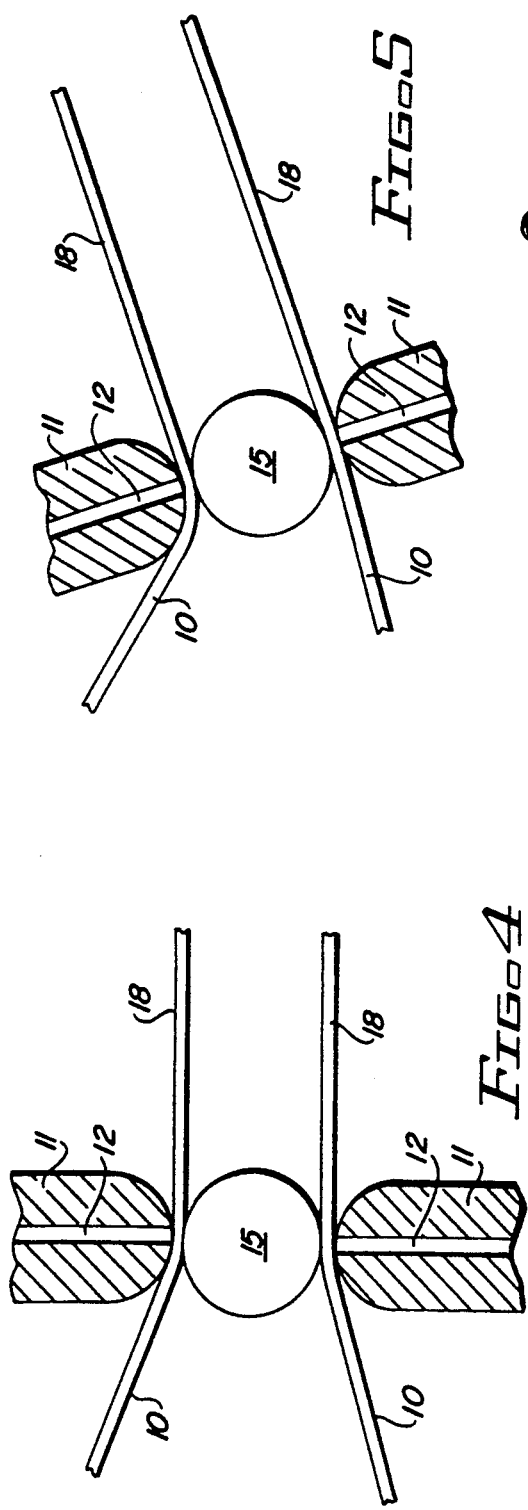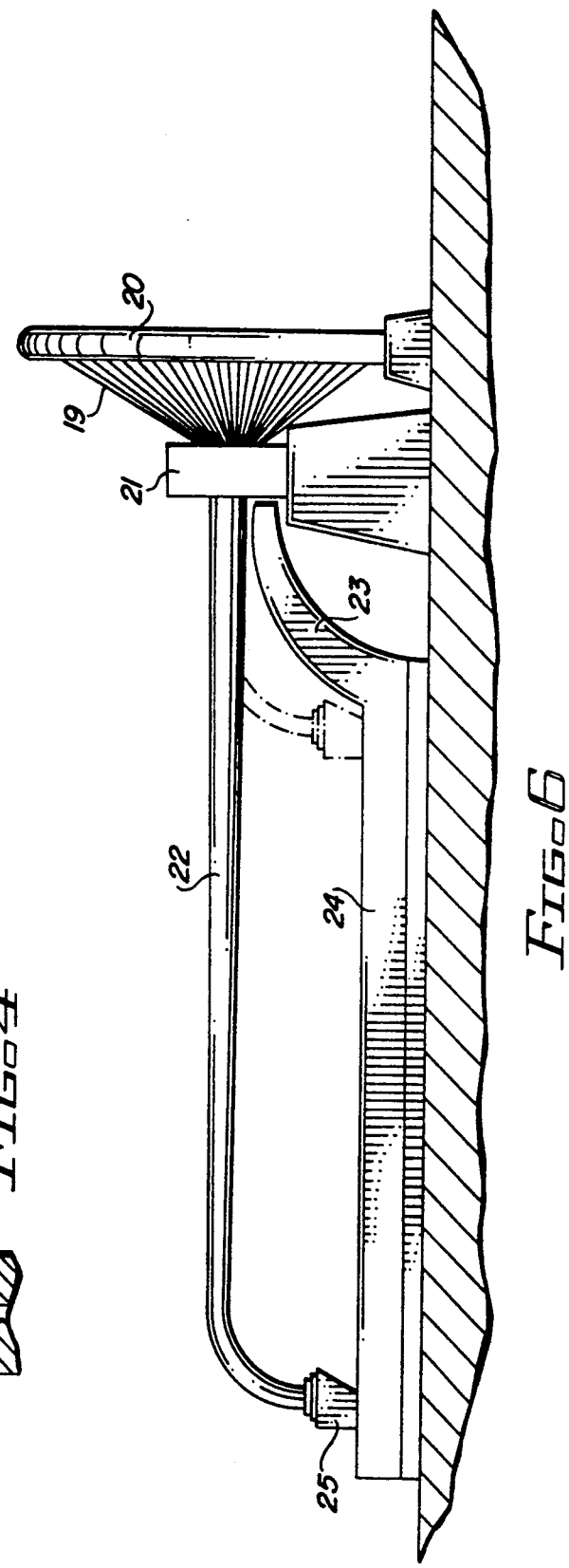

SHADOW BOUNDARY PROCESS FOR THE CONTINUOUS RADIANT CURE OF COMPOSITES

FIELD OF THE INVENTION

This invention relates to the production of fiber reinforced plastic structures employing a new process which provides greater economies, increased flexibility in application, and reduced emission of solvents into the environment, as compared with current procedures. More particularly, the invention relates to a method in which a continuously moving array of fibers is impregnated with resin and fast cured as it passes through a shadow boundary created by a source of radiant energy.

BACKGROUND OF THE INVENTION

Conventional structures (e.g., metallic, cement, wood, stone, brick, etc.) are being replaced with composite structures. Composites are typically made from two components: highly oriented, high strength/high modulus fibers embedded in a high performance matrix resin. Composite structures offer several advantages over conventional structures including excellent overall strength and stiffness to weight ratios, superior environmental resistance, better fatigue resistance, low thermal expansion characteristics, excellent fire resistance, and electrically and magnetically tailorable properties. To date, the acquisition costs of most composites have remained unacceptably high and have in effect prevented composites from replacing a much greater percentage of the conventional structure materials market.

Prices for composites have remained unacceptably high despite recent significant reductions in the costs of the raw materials that are used to make composites. Excessively high production associated costs are acting as a price barrier preventing composite structures from achieving a competitive advantage over most conventional structures. Production costs are driven by three primary factors: the costs associated with "laying down" the highly oriented fibers, the costs associated with effecting an adequate cure of the matrix resin, and the costs associated with the fabrication of composite worthy tools. Further aggravating the cost situation is the environmental problem involved in dealing with the disposal of the waste solvents given off in the cure of typical resin systems.

The first cost driver (applying the fibers onto a tool) is a problem that has been attacked with a variety of strategies. Among the alternatives that are currently being used are: hand layup, robotic "tape" laying machines, filament winding/braiding machines, and pultrusion machines.

Hand layup obviously requires high labor costs and results in low production rates.

Robotic "tape" laying machines eliminate much of the labor expense but utilize very expensive computer hardware/software. Relatively low production rates are obtained using robotic tape laying machines primarily caused by the requirement that the head of the tape spindle applies only one ply per pass.

In a filament winding/braiding process, a band of continuous rovings or monofilaments is wrapped around a mandrel and cured to produce axisymmetric hollow parts. Among the applications of filament winding/braiding are automotive drive shafts, helicopter blades, oxygen tanks, pipelines, spherical pressure vessels, conical rocket motor cases, and large underground gasoline storage tanks. United States patents describing various applications of the filament winding/braiding process are U.S. Pat. Nos. 4,892,764; 3,992,426; 4,515,737; 4,230,766; 4,479,984; and Re. U.S. Pat. No. 27,973. Filament winding/braiding machines are able to apply large amounts of material at high rates of speed with great economy. However, one is left with the problem of removing the volatile solvents, and the mandrel presents a problem of disposition after the article has been completed. In the vast majority of cases it is undesirable to leave the mandrel encased inside the composite part. To remove a mandrel often requires that the mandrel either (1) be capable of disassembly; (2) be made of a material that can be washed/flushed or melted out of the composite cavity; or (3) be inflatable thereby permitting it to be decompressed and then evacuated through an appropriate aperture in the composite skin.

Pultrusion machines essentially pull resin drenched fibril rovings through a female die while at the same time introducing heat to effect a cure. United States patents describing various forms of pultrusion machines are U.S. Pat. Nos. 4,477,702; 4,012,267; and U.S. No. 4,892,764. Generally, the heat in a pultrusion procedure must travel from the outside of the composite part at a finite rate. In such case it becomes necessary for the machine's cure station to be long enough to allow sufficient time for heat penetration or in the alternative it is necessary for the composite part to move through a shorter cure station at a reduced velocity. In the case of a radio frequency cured pultrusion machine, the cure is still thermal. In order for the polymers to form correctly the article being cured must not be physically manipulated during the cure. To allow extensive flexure would deleteriously affect the polymerization process. Thus in all thermal cases, the cure die must be long enough to support the composite part during the cure. This necessitates parts to be axial symmetric. The practice of making a long cure die and/or using slow flow rates increases costs. The relatively slow rate of heat transfer places an effective limit on the maximum wall thickness that can economically be produced in a pultruded part. The inability to achieve sufficiently thick wall thicknesses can eliminate the possibility of using the pultrusion technique for a wide variety of structural applications.

The second cost driver is the cost of effecting the cure of the resin matrix. In all the above systems it is necessary to introduce the matrix resin into the fibers. This can be done either before, during, or after the fibers have been placed on a tool or mandrel. However, almost all resin systems in use today are made of solids suspended in a variety of solvents. Depending on the method of fiber lay up, there may also be trapped foreign fluid. These solvents and foreign fluids must be removed from the composite part to reduce a detrimental condition referred to as porosity. In the majority of cases this requires the use of considerable consolidation pressure to squeeze the volatiles out of the curing part. The consolidation pressure is usually applied either by bagging the part under vacuum or using a wrapping of plastic shrink wrap. The process of bagging a part is time consuming and requires a significant expenditure of materials and hand labor. The solvents that are released during the cure pose an environmental risk as well as a risk to those who must handle the raw materials.

The third cost driver is the cost of making composite-worthy tooling. Composite tooling is fundamentally different from most metallic tooling inasmuch as composite tooling is specific to the part being fabricated whereas metallic tooling tends to be more universal. Composite tooling tends to be either a mandrel (see above) or a mold formed in the shape of the desired part. Routinely composite tooling must be capable of withstanding elevated temperatures and pressures. This tends to force composite tooling to be structurally robust and therefore expensive. Pultrusion dies are also expensive and are also very part specific. Metallic structural tooling design has had longer to evolve, and this has led to machining techniques that are far less part specific and more universal. It is a disadvantage of the production techniques presently practiced in the composite industry that they suffer from the lack of flexibility, adaptability and universality enjoyed by metallic machine processes.

It is an object of the present invention to provide a method which substantially reduces the several cost driving problems referred to above.

It is another object of the invention to provide a specialized procedure which allows radiant energy to be used to achieve an exceptionally fast cure of the fiber/matrix combination thereby permitting much greater flexibility in what types of parts can be fabricated at significantly reduced costs, or greatly reduced emission of solvents into the environment, or both.

It is a further object of the invention to provide a method which permits the use of the high speed and economy of filament winding/braiding machines while at the same time eliminating the need for a mandrel and the problems associated with disposing of it.

It is a still further object of the invention to eliminate the need for a mandrel in hand lay up and other methods.

It is a still further object of the invention to provide a method which eliminates the need for long cure dies in the pultrusion process, thereby speeding up the rate of production and enabling the manufacture of pultruded parts having greatly increased wall thicknesses and a great variety of non-axial parts.

Other objects and advantages of the invention will become apparent as the specification proceeds.

SUMMARY OF THE INVENTION

The present invention is based on the discovery that an exceptionally fast cure of a fiber/resin matrix can be achieved by using radiant energy to create a sharp boundary between radiated fiber/resin and the unradiated fiber/resin in the shadow area of radiation. The radiated area is fixed or substantially fixed at the point of radiation, while the area in the shadow is still subject to being shaped and manipulated. The sharp boundary between the cured and uncured material enables a significant simplification and reduction in size of t he forming/curing die in filament winding/braiding and pultrusion operations. It also enables the use of universal tooling, provides greater flexibility in the shape and size of the finished composite, eliminates the production of waste solvents and the need for mandrels, as will be explained in greater detail hereinafter.

The invention may be described in general terms as a method for producing a fiber/resin composite comprising the steps of preparing an array of fibers, feeding the array against and beyond a forming die, impregnating the array with a radiant curable resin by introducing the resin into the array at a point adjacent said die, and directing rays from a source of radiant energy against said die to form a sharp shadow boundary adjacent said die, whereby the impregnated array is rapidly cured upon passing through the sharp shadow boundary. Use of the term "adjacent" is intended to include introducing the resin just prior to the die, or inside the die, or at the tangent of said die.

In one preferred embodiment, the operative surface of the die which contacts the impregnated array has a curved configuration, and the rays of radiant energy are directed tangentially to said curved surface to provide a sharp shadow boundary which intersects the impregnated array at a point where the array is still in contact with the die. Another preferred embodiment includes use of a moving light to change location of the sharp shadow boundary, use of a varying die, or manipulation of the part post cure, or any combination thereof, to create a variety of variable cross section and nonaxial-symmetric parts.

BRIEF DESCRIPTION OF THE DRAWINGS

The objects, features and advantages of the invention will be apparent to those skilled in the art from the following detailed description, taken together with the accompanying drawings, in which:

FIG. 1 is a schematic side cross-sectional view illustrating a system for creating and utilizing the shadow boundary method of the present invention.

FIG. 2 is a cross-sectional end view taken along line A - A' of FIG. 1.

FIG. 3 is an end view taken along line B - B' of FIG. 1.

FIGS. 4 and 5 are schematic cross-sectional side views of the embodiment of FIG. 1, but showing rotation of the die to create a bend or curve in the composite.

FIG. 6 is a schematic elevational side view showing production of a cured composite street light pole.

DETAILED DESCRIPTION OF THE INVENTION

Although the method of the present invention may be practiced with numerous forms of equipment, the basic concepts will be described in detail in connection with the machinery shown in the accompanying drawings. Thus, in FIG. 1, there is a schematic illustration of a system for practicing the present invention in a pultrusion arrangement wherein a braided tube of fibers is impregnated with resin and cured while being drawn through a circular die to produce a composite tube. Alternatively, in FIG. 7 there is a schematic depiction of a system in which a flat piece of material is impregnated with resin and cured while being fed against an open die to produce a composite fiber/resin panel.

Figure 7:
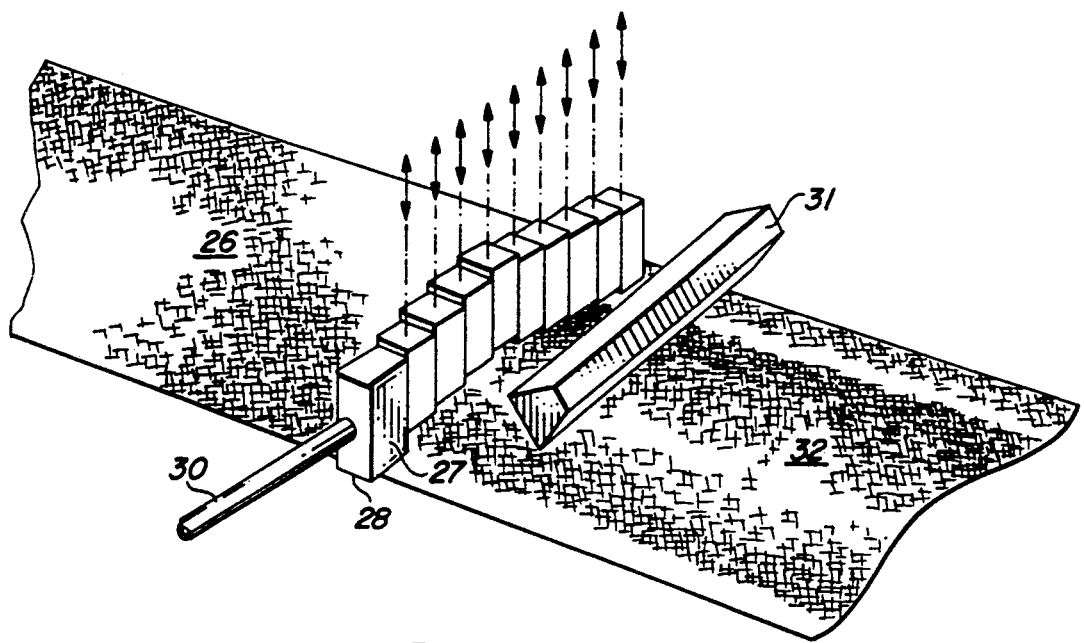
FIG. 7 is a perspective schematic view showing use of the shadow boundary method to produce an open part having a bend and variable shape.

As shown in FIG. 1, a tube 10 of oriented fibers in dry form is fed through a circular die 11. As the tube 10 passes through the die, a radiant curable resin is injected into the tube through an internal channel 12 in the die 11. The resin is introduced into the channel 12 from a storage tank 13 via an input pipe 14 (See FIGS. 2 and 3). The arrows within channel 12 in the die 11 show the direction of resin flow. An internal plug 15 serves to provide smoothness to the inside surface of the tube, if desired. Rays from a source or sources of radiant energy 16 are directed against the downstream side of the die 11 to provide a shadow boundary line 17 which intersects the resin-impregnated tube 10 at a point where the tube is still within the die 11. The resin in the tube is rapidly cured as it passes through the sharp shadow boundary line 17, and the fiber/resin matrix emerges from the die as a composite tube 18 which may be fully cured or partially cured and completely rigid or flexible. In the process of the present invention, the dry fiber tube 10 which is fed into the die 11 may be composed of any of the conventional strands of fibrous material, such as glass fiber or graphite fiber, which are used for the production of fiber/resin composites. Also, the tube 10 may be formed by any of the known techniques for producing an array of fibers. For example, fibers coming from a series of spindles (not shown) may be continuously braided to form the tube 10. This is a preferred approach because of the high production rates which can be achieved with braiding machines. However, the invention is applicable to dry, shaped fiber arrays, in braided or unbraided form, produced by any of the methods known to the art for laying up filaments in desired forms. It is not necessary that the dry fiber array be in the form of a hollow tube, since the invention is applicable to a wide variety of shapes, whether cylindrical or axial or otherwise, including solid rods, drive shafts, linkages, and the like. Also, as shown in FIG. 7 (to be described in greater detail hereinafter), the invention is also applicable to flat sheets or other nonaxial forms of fiber which may be fed against an open die and cured at the shadow boundary to provide panels or other objects of desired shape and size. If a hollow tube is desired, as in FIG. 1, the internal plug 15 may be used to impart a smoothness to the internal surface of the tube, but if smoothness is not required, the plug 15 may be omitted or varied without detriment to the integrity of the composite, since the correct degree of fiber nesting is achieved by the regulation of fiber tension in the die.

The resin which is injected into the fiber array may be any suitable radiant curable resin. Operable compositions include modified acrylic resins, vinyl polymers, unsaturated polyesters solubilized in vinyl monomers, and epoxy resins. Acrylic or methacrylic acid esters are preferred, with the most preferred compounds being the acrylic or methacrylic acid esters of polyhydric alcohols such as ethoxylated trimethylolopropane triacrylate and dipentaerythritol monohydroxy pentaacrylate. These resins have the advantage of curing extremely rapidly upon exposure to radiant energy, to permit completion of the cure upon passing through the sharp shadow boundary created in the present invention. The resins are also usable without solvents and therefore have the advantage of releasing no solvents to the atmosphere during the curing stage. Radiant curable resins sold under the trademark LITE-TAK by Loctite Corporation, of Newington, Connecticut, are suitable for use in the invention. Known photoinitiators may be added to the resin compositions in amounts effective to respond to the radiant energy and to initiate and induce curing of the resin.

It is a feature of the invention that the resin is introduced into the fiber array 10 from within the die 11, or closely adjacent thereto, so that the time between impregnation and radiation at the shadow boundary is extremely short. The resin is introduced through the fiber bundles under sufficient pressure or exposure that complete wetting of the fibers take place, but this requires no pressure or only moderate pressures compared to the high pressures involved in the prior art practice of thermally curing the composite piece. Although the arrangement shown in FIGS. 1 and 7 involves injecting the resin through channels in the forming die itself, it will be understood that satisfactory results can be achieved by placing injection jets immediately preceding the die.

The source of radiant energy used to create the shadow boundary in the present invention may be any source of actinic rays capable of fast-curing the injected resin. Although a wide variety of radiant energy sources are available, including X-ray, E-beam, radioactive, and the like, the objects of the invention are most readily obtained with high intensity ultraviolet rays such as obtained from high intensity mercury lamps. Other sources of ultraviolet include tungsten and xenon lamps, carbon arcs, and the like. With the appropriate combination of resin, source of radiant energy, and positioning of the rays according to the invention, the resin is fully cured just beyond the shadow boundary line while completely uncured on the upstream side of the boundary, and thus the fiber/matrix bundle emerges from the die fully cured and rigid.

The source of radiant energy is positioned on the downstream side of the die 11, and the rays from such source are concentrated and aimed in such manner as to create the shadow boundary line 17 in the area within or closely adjacent the die, as best shown in FIG. 1. This may be accomplished by placing a lamp 16 or series of lamps 16, as shown in FIGS. 1 and 3, downstream from the die 11. Although the benefits of the invention are obtained if the shadow boundary is located in the area just downstream from the die, best results are achieved if the boundary line is within the die itself. Therefore, it is a feature of the invention that the operative surface of the die 10 have a curved configuration, and that the rays of radiant energy from the lamps 16 are directed tangentially to the curved surface, thereby ensuring that the shadow boundary is created at a point where the fiber array is still within the die 10. If the die is designed to rotate about one or more axes to impart curves or bends to the composite finished product (as to be described hereinafter), it is preferred to incorporate rotation or shutter mechanisms for adjusting the direction of the rays responsive to the rotation of the die, so that the tangential correlation referred to above is maintained.

For some applications, it is useful to include an additional source of radiant energy on the inside of the tube which is being formed. Referring to FIGS. 1 and 3, it will be noted that a lamp 16A is located inside the tube, just downstream from the die 11, and that an additional shadow boundary line 17A is created on the tangency of the edge of the plug 15. This may be important in underwater, or space, or other applications where reflective conditions cause increased intensity of the cure on the outer surface of the tube first, thereby making it advantageous to supply additional rays for curing the interior surfaces.

It is an advantage of the invention that the die itself can be of the universal metallic tooling type, made from commonly available materials such as chrome-plated steel. The die configurations shown in the drawings can be readily and inexpensively made according to known techniques and can provide the curved operative surfaces used to create the shadow boundary, as well as the internal channels for injecting the resin into the fiber array at a point within the die. The invention contemplates the use of closed dies of any geometrical shape (circular, rectangular, triangular, etc.), as well as open dies against which preformed arrays of fibers may be fed. The invention further includes the use of rolling dies, in which the arrays of oriented fibers may be fed between opposing rollers, or between a single roller and an opposing stationary surface. In view of the extremely fast cure which is obtainable with the present invention, it is possible to reduce the operative length of the die—i.e., the dimension 19 as shown in FIG. 1—to 3 inches or less for most purposes.

Also because of the rapid cure that is available, it is possible to employ previously unavailable techniques for bending or shaping the composite product as it proceeds through the die. Thus, for example, as best shown in FIGS. 4 and 5, the die 11 may be rotated from the position shown in FIG. 4 to the position shown in FIG. 5 to produce a bend in the finished composite 18. The internal plug 15 is spherical for this application and is supported by a structure (not shown) attached to the plug at the equator of the sphere at the left side. The presence of the plug 15 enables maintaining a constant distance between the outer die 11 and the plug 15, thus permitting the part 18 to be made with uniform wall thickness as well as a constant fiber to resin ratio. Further, since the composite 18 is completely cured and rigid as it emerges from the die, it can be used to influence and stabilize the direction and degree of curve being imparted to the part. That is, the cured and rigid composite can sustain bending and torque loads, and thus pressure can be exerted against it to direct and stabilize the bending operation.

It is also a feature of the invention that the geometry of the die 11 may be varied as the forming operation proceeds, thereby producing axial composites having varying diameters and cross sectional shapes throughout their length. Thus, for example, tubes or cylinders can be made with a cigar-shaped configuration, or with a continuously diminishing diameter (such as a light pole), or with a pinch-waist configuration (such as a nuclear power plant flue), or with a tailored variable cross section (such as an airplane wing).

FIG. 6 illustrates an embodiment of the invention in which a fiber/resin composite is produced in the form of a light pole, using the bending techniques and variable geometry die techniques described above. In the illustration, braided fibers 19 emerging from a braiding fixture 20 are fed into a shadow boundary cure fixture incorporating a circular die, resin injection channels, and ultraviolet lamps for creating the shadow boundary contemplated by the present invention. In the initial segment of the procedure, the circular die is rotated on its axis to impart the curved configuration (shown by the broken lines) to the first section of the light pole 22. As the leading end of the pole 22 emerges from the fixture 21, it is guided downwardly to conform to the shape of the curved elevation 23 of the gantry 24. When the curved section is completed, the circular die is rotated to a position for producing a straight section of pole, and the end of the pole is moved ahead and attached to the movable gantry head 25. As the operation proceeds, the gantry head moves to its final position as shown in the drawing. During the operation, the inside dimension of the circular die within the shadow boundary cure fixture 21 is gradually increased, so that the diameter of the straight section of the light pole 22 is also gradually increased, eventually resulting in a final product as shown in the drawing.

FIG. 7 shows an embodiment of the invention in which a flat array of oriented fiber is fed into an open die, where it is impregnated with resin and cured across a shadow boundary to produce a curved sheet or panel of fiber/resin composite. The starting material is a flat sheet 26 which may be made by braiding a hollow tube of fibers and then slitting the wall of the tube parallel to the axis, or it may be made by any of the other conventional methods of laying up a sheet of oriented fibers. The sheet 26 is fed against and beyond an elongated open die 27 positioned transversely to the direction in which the sheet is moving. Die 27 may be fitted with actuators to impart curvature to the cured sheet. Die 27 has a curved operational surface 28 against which the sheet is fed. Resin is continuously fed into the die 27 from a supply tank 29 via an input pipe 30. Resin from the supply tank 29 is introduced into the sheet 26 through channels (not shown) in the die 27 and communicating with the bottom surface thereof. A source of radiant energy 31 such as ultraviolet light is positioned to direct a concentration of rays tangentially against the bottom surface of the die to create a sharp shadow boundary beneath the die adjacent the point where the resin is injected into the sheet 26. When the impregnated sheet 26 passes through the shadow boundary it is rapidly cured to produce a composite fiber/resin sheet 32 which is rigid and which may be used to bend and shape the segment passing through the die in any predetermined manner. Die 27 may be flexible, and it may be programmed to assume successively different shapes in response to differing pressures introduced hydraulically or mechanically or otherwise into predetermined sections of the die, as represented by the series of arrows in FIG. 7. As an example, by continuously flexing the die 27, it is possible to make articles such as the sides of automobiles and trucks (of course subsequent trimming must be done). It is further possible for a single machine to be used to make all car bodies by simply programming the machine to make 400 left fenders for vehicle "A", for example, and then to start making the rear right quarter panel of vehicle "B" in a continuous fashion, simply by changing the machine's programming.

Figure 8:
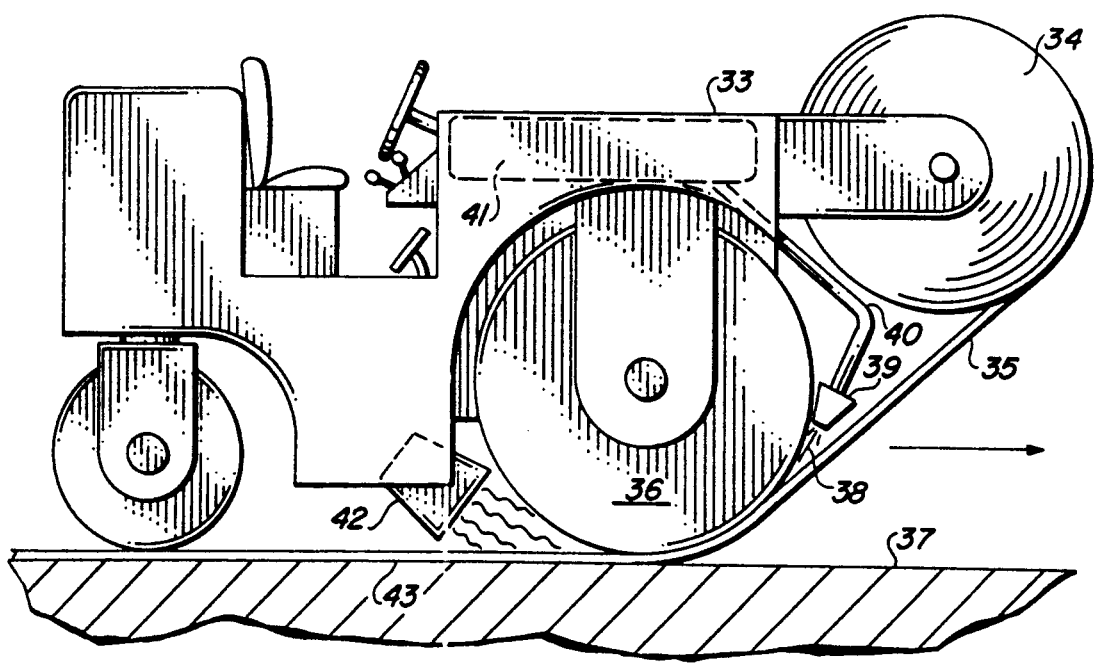
FIG. 8 is a schematic side elevational view showing use of a rolling machine to lay down a cured composite road surface.

FIG. 8 is a schematic illustration of a particular embodiment in which the method of the present invention is used to apply a layer of fiber/resin composite to a surface such as a road. In this embodiment, an ordinary road rolling machine 33 is modified to include a roll 34 of fibrous material 35 placed in such fashion as to be drawn over the front surface of the forward roller 36 of the road machine 33. As the machine moves forward in the direction shown by the arrow, the fabric continues around the front face of the roller 36 to make contact with the road surface 37. Depending upon the weight of the machine 33, high compression loads develop within the fabric. In the embodiment, radiant curable resin 38 is injected to impregnate the fabric at a point immediately preceding the point where the fabric first contacts the road surface. The resin is applied through an injection head 39 which receives its supply of resin through pipe 40 from resin tank 41. A very complete impregnation of the fabric 35 is obtained under these conditions.

In the FIG. 8 arrangement, a source 42 of radiant energy is placed immediately behind the roller 36 and aimed at the tangency point between the roller and road surface to create a shadow boundary at a point where the fabric is still under compression between the roller 36 and the road surface 37. The action of the rays of radiant energy causes curing of the fiber/resin matrix at the shadow boundary, adhering the matrix firmly to the road surface at the interface 43. In this embodiment, a strip of composite material is adhered to the road anywhere the vehicle is driven. Thus a one-step method is provided to replace the conventional two-step procedure in which a fabric or tape layer is first laid on the road surface and then, in a second step, subjected to thermal curing.

Using the method of the present invention, a wide variety of shapes and sizes of fiber/resin composites can be made rapidly and inexpensively. Obviously, tubes, conduits, columns, aircraft air conditioning ducts, and other circular cross section structures may be fabricated. With variable geometry dies, components such as wing sections are possible. By running the fibers past, rather than through, a die it is possible to make components such as highway guard rails, wall panel sections, large flat skins for aircraft, ships, submarines, and the like.

It is a feature of the invention that the method is operable if the work piece is held stationary and the shadow boundary fixture is moved with relation to the work piece. For example, in the making of large civil engineering project such as a pipeline, it is possible to move the shadow boundary fixture on a self-propelled or robotic basis along the length of the line to produce a continuous, seamless pipe miles long, with pigtails set periodically to take up the shock of movement. Similar projects such as aqueducts and subway tubes are also applicable.

The shadow boundary method of the present invention includes the following features which are significantly advantageous in terms of effectiveness and economy:

1. Nonaxial parts can readily be made using the procedures described herein.
2. There is no requirement to use a mandrel. This permits the making of continuous parts of great lengths if desired.
3. The radiant cure systems utilized herein are deeply penetrating, and therefore thick sections of composite can be made in a single pass.
4. Since the fibers move through a stationary tool surface (as opposed to the moving tape laying machine spindles of the prior art), it is possible to make components at high production rates.
5. The process lends itself very readily to automation and therefore greatly reduces the amount of labor required to make a part.
6. Large plate sections can be fabricated by having the fiber/resin system move against an open die.
7. Unlike a thermal cure in which large portions of the laminate are heated to the cure temperature to initiate the cure, the shadow boundary cure of the present invention takes place in a very limited region with completely uncured resin directly adjacent to the cured section. It is possible with this type of curing arrangement to stop a cure and restart it at a later time without significant degradation to the part.
8. Thermally cured resins require low temperatures to have a long shelf life. As a result, thermally cured laminates must be laid up in a finite period of time because to leave them at room temperatures will cause a degradation to the matrix. This factor limits the practical size of most laminates, since, once the job is begun, it must proceed until completion. The method of the present invention does not suffer this type of penalty. When a shadow boundary cure is in operation, the machine can simply be turned off and the cure will be suspended at a precise location. The operators can leave and return days later and, simply by turning the machine back on, commence the cure at the location where it was stopped with little or no degradation to the part.
9. Thermal systems are usually laid up in a dedicated clean room. Thermally cured systems are very slow and usually require significant hand procedures to accomplish the layup before subjecting the part to the cure process. During this period of time the part is very subject to contamination from dust and dirt and other foreign objects. In addition, the size of the part is limited to the size of the clean room. The shadow boundary cure of the present invention eliminates these concerns, as the action takes place within the die in a fraction of a second. With comparatively simple precautions it is possible to avoid contamination problems and thereby eliminate the need for an expensive dedicated clean room.
10. For practice of the present invention, it is much more possible to use tools that are universal, as opposed to part specific.
11. The method of the invention permits utilization of solvent-free resins, and accordingly the environmental problems associated with the disposal of solvents is eliminated.
12. The present method is operable in outer space and underwater applications. In the prior art thermal cure processes, in which the cure takes place over a long period of time, the resin gel tends to boil away under outer space conditions before the cure is completed, and in underwater applications the resin is subject to massive contamination prior to completion. In the present invention, the completion of the cure is so rapid that these problems are eliminated or substantially minimized.

Although various preferred embodiments of the invention have been described herein in detail, it will be understood by those skilled in the art that variations may be made thereto without departing from the spirit of the invention.

What is claimed is:

1. A method for producing a fiber/resin composite comprising the steps of preparing an array of fibers, feeding said array against and beyond a forming die, impregnating said array with a radiant curable resin by introducing said resin into the array at a point adjacent said die, and directing rays from a source of radiant energy against said die to form a shadow boundary adjacent said die, whereby the said impregnated array is rapidly cured upon passing through said shadow boundary.

2. The method of claim 1 wherein said array is fed against and beyond said die by holding the die stationary and moving the array.

3. The method of claim 1 wherein said array is fed against and beyond said die by holding the array stationary and moving said die.

4. The method of claim 1 wherein the operative surface of said die has a curved configuration and the rays of radiant energy are directed tangentially to said curved configuration to provide a shadow boundary intersecting said array at a point where said array is still in contact with said die.

5. The method of claim 1 wherein said array is fed through a closed die having a predetermined shape to produce a cured composite having a predetermined configuration.

6. The method of claim 5 wherein said closed die is rotated to a predetermined angle at a predetermined time to produce a curve in said cured composite at a predetermined point.

7. The method of claim 5 wherein said rays of radiant energy are redirected responsive to the rotation of said die, whereby said rays maintain their tangential relationship to the curved surface of said die to provide a shadow boundary intersecting said array at a point where said array is still in contact with said die.

8. The method of claim 1 wherein said array is fed against and beyond an open die to provide a cured composite having an open configuration.

9. The method of claim 1 wherein said source of radiant energy is ultraviolet radiation.

10. The method of claim 1 wherein said steps are carried out under outer space conditions.

11. The method of claim 1 wherein said steps are carried out under water.

12. A method for producing a tubular fiber/resin composite comprising the steps of braiding fibers to produce a braided tube, feeding said tube through a circular forming die, impregnating the fibers of said braided tube with radiant curable resin by introducing said resin through said die into said tube while still within said die, and directing rays from a source of radiant energy against said die to form a shadow boundary intersecting said impregnated tube at a point within said die, whereby the said resin impregnated fiber tube is rapidly cured upon passing through said shadow boundary.

13. The method of claim 12 wherein said braided tube is introduced into said die along a predetermined axis and a curve is introduced into said cured tube by rotating said die on an axis normal to the axis of introduction of the said tube.

14. The method of claim 12 wherein said rays of radiant energy are redirected responsive to the rotation of said die, whereby said rays maintain a tangential relationship to the curved surface of said die to provide a shadow boundary intersecting said tube at a point where said tube is still in contact with said die.

15. The method of claim 12 wherein said braided tube is introduced into said die along a predetermined axis and a curve is introduced into said tube by exerting pressure on the cured portion of said tube to bend the tube to a predetermined angle to the axis of introduction of the said tube.

16. The method of claim 12 wherein a gantry is provided to support said tube after it has passed through said die.

17. The method of claim 12 wherein the cross sectional configuration of said tubular fiber/resin composite is varied at predetermined points by adjusting the geometry of said die as said predetermined points on said tube are reached.

18. The method of claim 12 wherein the radiant curable resin is selected from the group consisting of modified acrylic resins, vinyl polymers, unsaturated polyesters solubilized in vinyl monomers, and epoxy resins.

19. The method of claim 12 wherein radiant energy is directed against the interior walls of said tube from a source located on the interior of said tube.

20. The method of claim 12 wherein the radiant curable resin is a methacrylic resin.

21. The method of claim 12 wherein said source of radiant energy is ultraviolet radiation.

22. A method for producing a fiber/resin composite comprising the steps of moving an array of oriented fibers against and beyond an open die which is positioned transversely to the path of travel of said array, impregnating said array with a radiant curable resin by introducing said resin into the array while it moves through said die, and directing rays from a source of radiant energy against said die to form a shadow boundary adjacent said die, whereby the said impregnated array is rapidly cured upon passing through said shadow boundary.

23. The method of claim 22 wherein said array is a relatively flat sheet of oriented fibers, said sheet is fed against said die in a predetermined plane and a bend is introduced into said sheet by exerting pressure on the cured portion of said sheet to bend the sheet to a predetermined angle to the plane of introduction of the said sheet.

24. The method of claim 23 wherein the operative surface of said die has a curved configuration and the rays of radiant energy are directed tangentially to said curved configuration to provide a shadow boundary intersecting said sheet at a point where said sheet is still in contact with said die.

25. The method of claim 22 wherein said die is flexed from one configuration to another at predetermined times during the procedure to produce corresponding curves in the resulting cured sheet.

26. The method of claim 22 wherein the radiant curable resin is selected from the group consisting of modified acrylic resins, vinyl polymers, unsaturated polyesters solubilized in vinyl monomers, and epoxy resins.

27. The method of claim 22 wherein the radiant curable resin is a methacrylic resin.

28. The method of claim 22 wherein said source of radiant energy is ultraviolet radiation.

29. A method of applying a fiber/resin composite layer to a surface comprising the steps of moving a rolling die along said surface, continuously feeding a sheet of fibers into the leading bite between said roller and said surface, impregnating said sheet with a radiant curable resin by injecting said resin into said sheet across the width of said sheet adjacent said leading bite, and directing rays from a source of radiant energy against said rolling die to form a shadow boundary across the width of said sheet adjacent said die, whereby the said impregnated sheet is rapidly cured and adhered to said surface upon passing through said shadow boundary.

30. The method of claim 29 wherein said source of radiant energy is positioned behind said rolling die and said rays are directed tangentially to the surface of said die to provide a shadow boundary intersecting said sheet at a point where said sheet is still in contact with said die.

31. The method of claim 29 wherein said rolling die is urged against said surface under pressure as it proceeds along said surface, whereby said sheet is simultaneously cured, pressed and adhered to said surface as it passes through said shadow boundary.

32. The method of claim 29 wherein the radiant curable resin is selected from the group consisting of modified acrylic resins, vinyl polymers, unsaturated polyesters solubilized in vinyl monomers, and epoxy resins.

33. The method of claim 29 wherein the radiant curable resin is a methacrylic resin.

34. The method of claim 29 wherein said source of radiant energy is ultraviolet radiation.

* * * * *